US00RE33878E

United States Patent [19]

Bartlett et al.

[11] E Patent Number: Re. 33,878

[45] Reissued Date of Patent: Apr. 14, 1992

[54] CRYOGENIC RECONDENSER WITH REMOTE COLD BOX

[75] Inventors: Allen J. Bartlett, Milford; Bruce R. Andeen; Philip A. Lessard, both of Boxborough, all of Mass.

[73] Assignee: Helix Technology Corporation, Waltham, Mass.

[21] Appl. No.: 571,870

[22] Filed: Aug. 22, 1990

Related U.S. Patent Documents

Reissue of:

[64] Patent No.: 4,766,741
Issued: Aug. 30, 1988
Appl. No.: 5,082
Filed: Jan. 20, 1987

[51] Int. Cl.[5] ..... F17C 5/02

[52] U.S. Cl. ..... 62/47.1; 62/51.1; 165/133

[58] Field of Search ..... 62/51.1, 48.2, 47.1; 165/133

[56] References Cited

U.S. PATENT DOCUMENTS

| | | | |
|---|---|---|---|
| 3,299,646 | 1/1967 | Stuart et al. | 62/40 |
| 3,360,955 | 1/1968 | Witter | 62/335 |
| 3,878,691 | 4/1975 | Asztalos | 62/514 R |
| 3,972,202 | 8/1976 | Stearns | 62/514 R |
| 4,040,479 | 8/1977 | Campbell et al. | 165/133 |
| 4,189,930 | 2/1980 | Davydov et al. | 62/514 R |
| 4,194,384 | 3/1980 | Fujie et al. | 165/133 |
| 4,223,540 | 9/1980 | Longsworth | 62/514 R |
| 4,432,216 | 2/1984 | Matsuda et al. | 62/514 R |
| 4,484,458 | 11/1984 | Longsworth | 62/514 JT |
| 4,498,313 | 2/1985 | Hosoyama et al. | 62/514 R |

OTHER PUBLICATIONS

Longsworth, R. C., "Interfacing Small Closed-Cycle Refrigerators to Liquid Helium Cryostats", Cryogenics, Apr. 1984, pp. 175-178.

Mori et al., "Optimized Performance of Condensers With Outside Condensing Surfaces" Transactions of the ASME, vol. 103, Feb. 1981.

CVI Incorporated, "CGR511-4.5 Ultralow Temperature System: 4.5 Kelvin Cryogenic Refrigeration System" Brochure Jun. 1991.

Noranda Metal Industries Inc., "Forge Fin ®: Integral Inner-Fin Tubing" Brochure.

J. A. Jones and P. M. Golben, "Design, Life Testing, and Future Designs of Cryogenic Hydride Refrigeration Systems", *Cryogenics*, vol. 25, pp. 212-219, Apr. 1985.

National Aeronautics and Space Administration Contract No. NAS7-100, "Technical Support Package on Spring Loaded Joule-Thomson Valve", NASA Tech Brief, vol. 10, No. 3, Item No. 8, from JPL Invention Report NPO-16546/6048, pp. 1-3, May/Jun. 1986.

Sumitomo Heavy Industries, Ltd., "Sumitomo's Refrigerator" Brochure, May, 1986

T. Koizumi et al., "Recondensing Refrigerator for Superconducting NMR-CT", pp. 1-9, Sep. 1987.

Takashi Ishige, et al., "4.2K Refrigerator for SQUID Magnetometer", pp. 1-10, Oct. 1984.

*Primary Examiner*—Ronald C. Capossela

*Attorney, Agent, or Firm*—Hamilton, Brook, Smith & Reynolds

[57] ABSTRACT

A recondenser cycles a working volume of cryogen gas through a remote cold box and a coaxial recondensing, heat exchanger transfer line which is inserted into a cryostat. The working volume of gas is compressed to a high pressure and cooled through cooling means which include a mechanical refrigerator of the regenerator-displacer type. The cooled gas is expanded through a first JT valve to a medium pressure and further cooled. The further cooled medium pressure gas is transferred in a closed coaxial transfer line to a cryostat in which boil-off is recondensed. A second JT valve in the cryostat end of an inner tube coaxially positioned in an outer tube forming the transfer line expands the gas to a lower pressure and forms a liquid-gas mixture. The liquid-gas mixture is passed in heat exchange relation with the boil-off from an inner tube to an outer tube of a coaxial recondensing heat exchanger. The outer surface of the outer tube at the cryostat end of the transfer line has burrs which provide the necessary surface area on which to recondense the boil-off. The gas is transferred back to the cooling means through intermediate channels formed between the outer tube and the coaxially positioned inner tube.

52 Claims, 5 Drawing Sheets

CRYOGENIC RECONDENSER WITH REMOTE COLD BOX

Matter enclosed in heavy brackets [ ] appears in the original patent but forms no part of this reissue specification; matter printed in italics indicates the additions made by reissue.

BACKGROUND OF THE INVENTION

Several superconducting devices of today, such as superconducting computers and superconducting magnets of magnetic resonance imaging systems, use an inventory of liquid cryogen (i.e. helium) for continuous refrigeration. Usually a cryostat or vacuum jacketed reservoir of the liquid cryogen is used to cool the device to achieve superconductivity. As the device is used, heat is generated and the inventory of liquid cryogen boils off. In the case of mobile magnetic resonance imaging systems, it is necessary to demagnetize the device for each rod trip. The demagnetization process further causes several liters of cryogen to be boiled off. In order to maintain and replenish the inventory of liquid cryogen a continuous supply of gaseous cryogen must be provided, liquified and introduced into the liquid inventory; or a means of recondensing the boil off back into the liquid inventory must be provided.

One approach to recondensation has been to collect the venting gas and direct it to refrigeration apparatus outside of the cryostat which recondenses the cryogen. The liquid cryogen is reintroduced into the cryostat. However, problems arise in transferring the liquid cryogen back to the cryostat while maintaining the cold temperature.

Another approach has been to place a refrigerator directly in an access port or neck of the cryostat. Such refrigerators are disclosed in U.S. Pat. Nos. 4,223,540 and 4,484,458. Each discloses a displacer-expander refrigerator in conjunction with a Joule-Thomson heat exchanger. The refrigerator is disposed in at least one access port to cool heat shields of the cryostat and to recondense the cryogen boil-off. U.S. Pat. No. 4,223,540 minimizes heat transfer losses by matching the temperature gradient in the access port. U.S. Pat. No. 4,484,458 matches the thermal gradient in the heat exchanger with that of the refrigerator, to minimize heat loss in the cryostat when the refrigerator is in use.

Having the apparatus or a refrigerator disposed within the cryostat housing, it then becomes necessary to provide means to remove the refrigerator should it have to be serviced. With such removal, however, there is a danger of exposing the liquid cryogen inventory to ambient conditions and allowing heat infiltration which would in turn promote cryogen boil-off. One method to solve this problem of removal is to specially design the cryostat. However, the refrigerators for such cryostats typically have relatively high heat transfer losses, and the cryostats have large cross-sectional areas. U.S. Pat. No. 4,223,450 discloses a cryostat utilizing a closed-cycle refrigerator with several stages of refrigeration to intercept heat leak into the liquid cryogen and to recondense cryogen boil-off. The cryostat is adapted to removal, repair and replacement of the refrigerator while the superconducting device continues operation. However, designing such a cryostat for each different super conducting device is costly and impractical.

A further problem with cryostat refrigerators of prior art is the large access area to the cryostat necessitated by the refrigerator compared to the smaller access ports of todays devices. Smaller access ports are being made to decrease the amount of heat infiltration to the cryogen and therefore to prevent promotion of boil-off. More particularly, in the case of a magnetic resonance imaging system, the access port is about one inch in diameter which is much smaller in diameter than any refrigerator of prior art.

In another approach, it has been suggested to condense an outside source of helium gas to liquid form, transfer the liquid helium into a cryostat through a transfer line in heat exchange with the boil-off and thereby recondense the boil off to replenish the liquid cryogen contained in the cryostat.

SUMMARY OF THE INVENTION

The normnal boiling point of liquid helium is about 4.2 K. at about 1 atm pressure. In order to provide refrigeration below about 4.5 K. to condense boil-off of liquid helium contained in a cryostat, the present invention cools and expands a stream of helium gas to form a cold low pressure mixture of helium liquid and gas, and places the mixture in heat exchange relation with the boil-off. The stream of helium gas is precooled by means including a mechanical refrigerator. The precooled gas is then carried to the cryostat through a transfer line from the cooling means which are remote from the cryostat. The end of the transfer line in the cryostat has a Joule-Thomson (JT) valve through which the precooled gas is expanded to form the cold low pressure mixture of helium liquid and gas. The mixture is passed in heat exchange relation with the boil-off.

In a preferred embodiment, the mechanical refrigerator of the cooling means is of the regenerator-displacer type, such as the Gifford-McMahon refrigerator. In accordance with one aspect of the invention, the cooling means includes another JT valve positioned outside of the cryostat at an intermediate temperature. The JT valve expands the precooled helium gas to a medium pressure gas enabling greater thermodynamic efficiency in the expansion through the final JT valve at the end of the transfer line in the cryostat.

In accordance with another aspect of the invention, the end of the transfer line positioned in the cryostat comprises an outer tube having burrs on its outer surface and an inner tube positioned coaxially within the outer tube. The burrs are unitary with the outer tube and are formed by a series of radial and circumferential cuts into the outer surface to provide a large surface area per unit of projected area. Further, the finished outer diameter is less than about 1 inch to enable the transfer line to fit through the small access ports of an MRI cooling bath system and the like. With a small outer diameter of the transfer line which enables access to confined [area cryostats] *cryostat areas* through limited port areas and with the mechanical refrigerator remote from the cryostat, heat infiltration to the cryostat and boil-off in the cryostat are minimized. Further, the transfer line is the only part that must be customized for specific uses; the remote mechanical refrigerator and cooling means are adaptable to almost any system.

The transfer line itself serves as a coaxial precooling heat exchanger and supports the final JT valve and a coaxial recondensing heat exchanger. The transfer line passes the cold gas between a central channel and outer channels formed by the inner tube coaxially positioned within the outer tube. In the preferred embodiment, the expanded and cooled gas is transferred to the cryostat end of the transfer line through the central channel of the inner tube and is transferred in the reverse direction through the outer channels between the outer and inner tube.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 1:
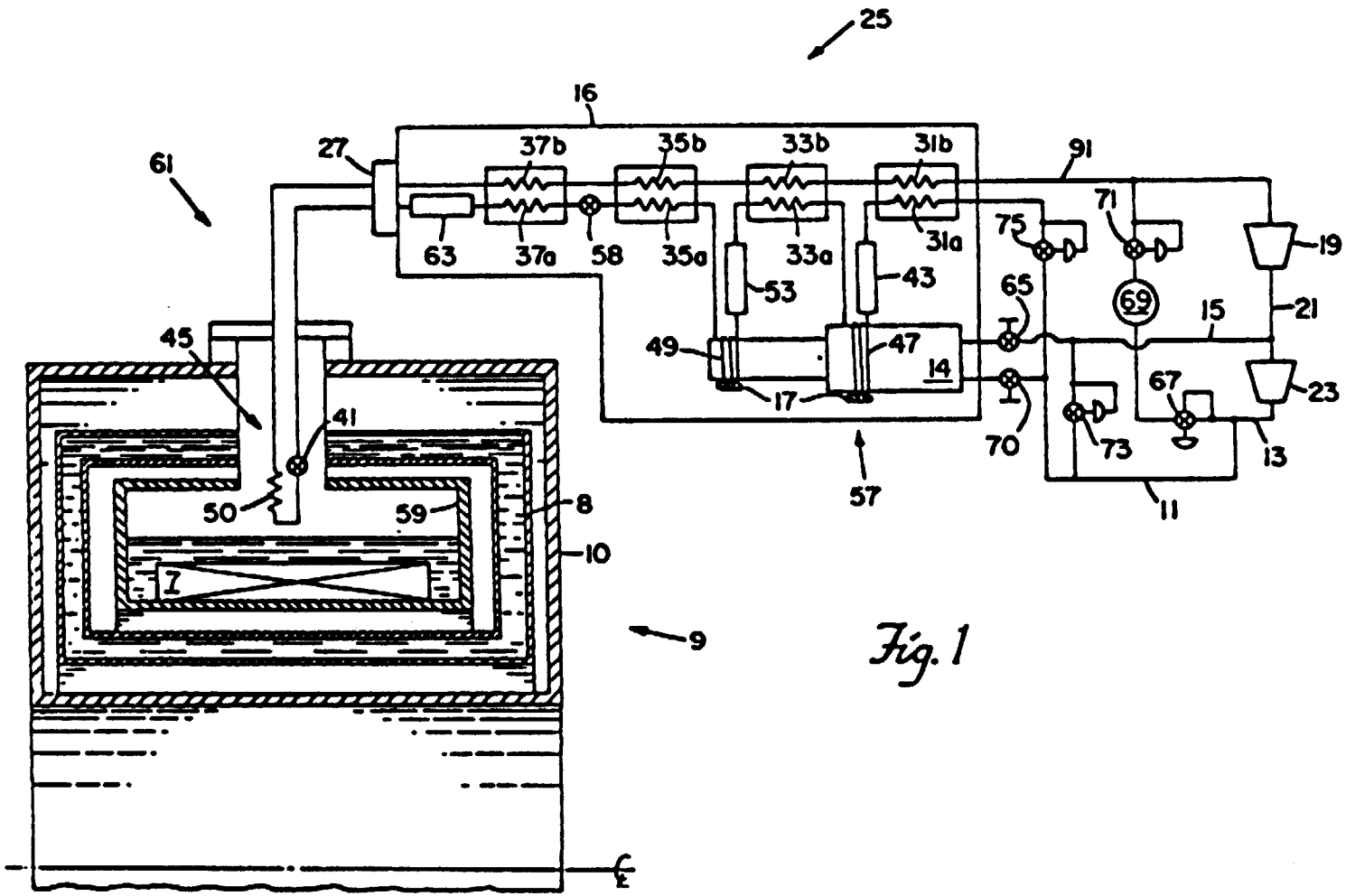
FIG. 1 is a schematic illustration of a recondenser embodying the invention and having cooling means remote from a cryostat in which recondensation occurs.

Applicant utilizes a two stage cooling and expansion scheme to provide refrigeration in a cryostat, and more specifically to provide refrigeration so as to recondense boil-off from a bath of liquid cryogen retained in a vacuum jacketed cryostat 59 for cooling a magnet 7 of an MRI system 9 shown in FIG. 1. In such a system, an annular shaped structure 10 houses the vacuum jacketed cryostat 59 retaining the super conducting magnet 7 in a bath of liquid cryogen. The subject (a person) to be viewed by the MRI system 9 is placed in the center of the annular structure 10. As the MRI system 9 is used the magnet 7 is supercooled in the bath of liquid cryogen retained in cryostat 59. Heat radiation produced during use of the MRI system 9 is absorbed by a bath of liquid nitrogen 8 which encompasses the cryostat 59.

To clarify a distinction between the use of the term "cryostat" and that of the term "dewar", the following definitions are used. A "cryostat" is a liquid cryogen retainer in which the cryogen is utilized for some purpose other than mere storage. A "dewar" is a vessel for only storing the contents.

Apparatus for refrigerating and recondensing cryogen in a cryostat embodying the present invention is shown in FIG. 1. A volume of working gas (i.e. helium) enters one of the staged compressors 19 where the gas is compressed from about 1 atm to about 6 atm. The compressed gas is subsequently compressed through compressor 23 which generates a gas at a high pressure of about 20 atm. The high pressure gas flows from compressor 23 to cooling means 25. Within cooling means 25, the gas is cooled to a temperature of about 10 degrees Kelvin through heat exchangers 31, 47, 33, 49 and 35. Heat exchangers 31, 33 and 35 are counterflow heat exchangers, and exchangers 47 and 49 are cooled by mechanical refrigerator 57. The cooled gas is then expanded through JT valve 58 to a temperature of 8.5 degrees Kelvin and a pressure of about 6 atm. The expanded gas is cooled through heat exchanger 37 to a temperature of about 5 degrees Kelvin. The gas is then carried by a coaxial heat exchanger transfer line 61 from the cooling means 25 to the cryostat 59 in which refrigeration and recondensation of boil-off is to take place. The transfer line 61 provides further counterflow heat exchange and further cools the gas. A second JT valve 41 is positioned at the cold end 45 of the transfer line placed in the cryostat 59. The gas is expanded through JT valve 41 from 6 atm at about 5 degrees Kelvin to about 1 atm at about 4.2 degrees Kelvin at which point the helium gas turns to a liquid-gas mixture. The liquid-gas mixture formed in cold end 45 of transfer line 61 is in heat exchange relation with the contents of the cryostat 59 in a recondensing heat exchanger 50. The mixture absorbs heat from the boil-off and condenses the boil-off back into the cryostat 59. Hence cold end 45 provides the necessary refrigeration within cryostat 59. The low temperature gas is then recycled through the transfer line 61 back through the heat exchangers of cooling means 25 and to compressor 19.

Figure 2:
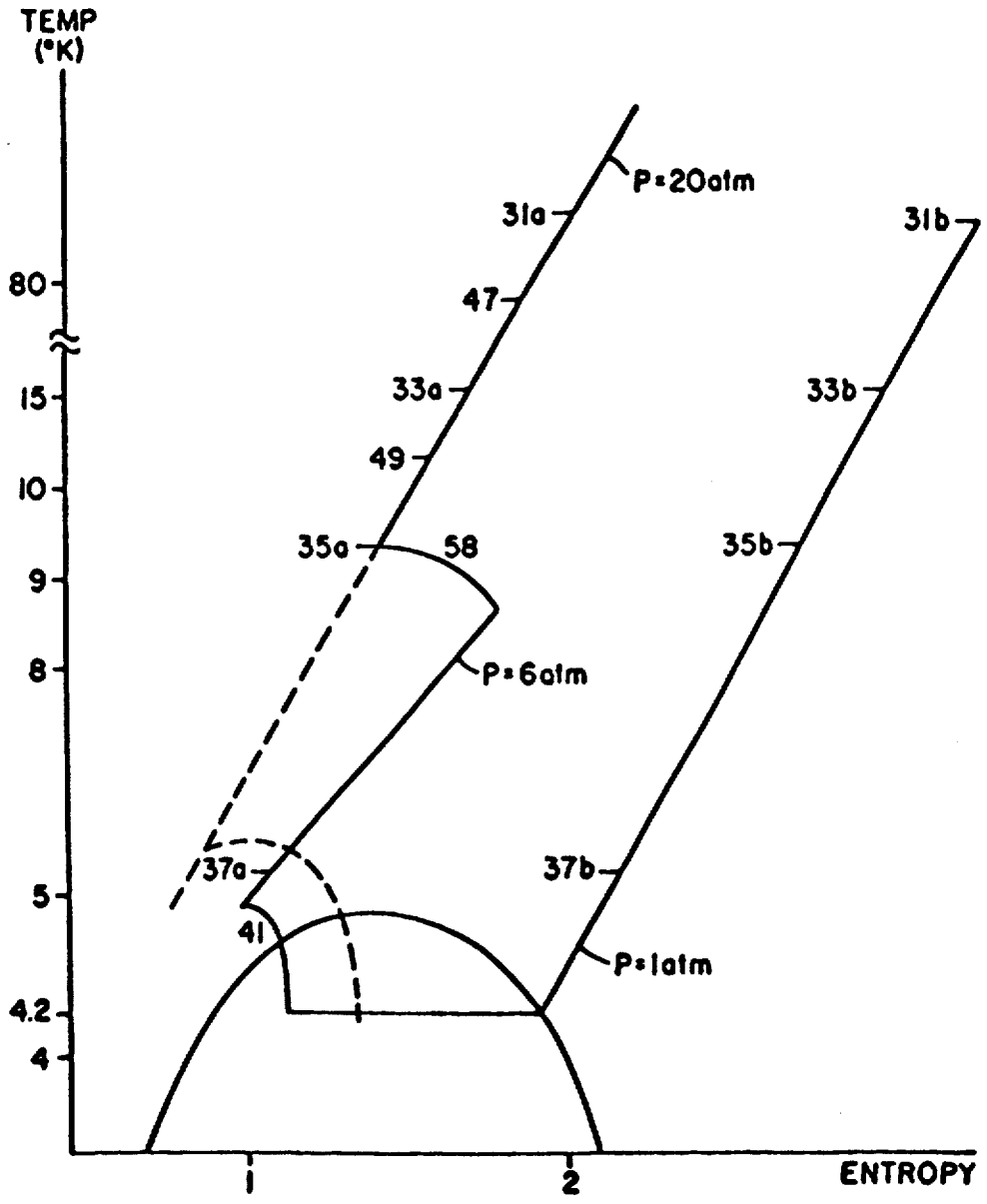
FIG. 2 is a temperature-entropy graph for helium illustrating a typical system cycle.

A temperature entropy diagram of this embodiment is shown in FIG. 2. As shown by the solid line in FIG. 2, applicant begins by cooling helium gas compressed at about 20 atm. The gas is cooled to about 10 degrees Kelvin through heat exchangers 31a, 47, 33a, 49 and 35a, and expanded at constant enthalpy through a first JT valve 58 to a pressure of about 6 atm just below 9 degrees kelvin. The gas is then cooled along the constant pressure line of about 6 atm through heat exchangers 37b and transfer line 61 to about 5 degrees Kelvin where it is expanded at constant enthalpy through a second JT valve 41. This time the gas is expanded to about 1 atm at about 4.2 degrees Kelvin which produces a liquid gas mixture in the ratio of about 2 to 1.

The high liquid to gas ratio provides for good refrigeration at the 4.2 degrees Kelvin and 1 atm pressure. That is, due to the high liquid content formed relatively, large amounts of heat may be absorbed without the liquid-gas mixture increasing in temperature along the 1 atm line.

It is appreciated that helium gas must be cooled to temperatures below about 10 degrees Kelvin or less before expansion of the gas at constant enthalpy to a lower pressure will reach a liquid-gas phase. Assuming the same starting temperature of expansion, it is typically preferred to begin such cooling and expanding at high pressures to reach a sizeable ratio of liquid to gas upon the isenthalpic expansion to a lower pressure. However, during a one stage isenthalpic expansion at such high pressures at a temperature of about 4.6 degrees Kelvin, the helium gas increases in temperature before reaching the two phase stage as shown by the broken line in FIG. 2. The contents of the cryostat 59 are very sensitive to such an increase or any increase in temperature. Hence it is crucial to minimize temperature increase during expansion within the cryostat. Beginning the isenthalpic expansion at lower pressure levels and at about the same temperature of 4.6 degrees Kelvin increases the thermodynamic efficiency of the system but creates mechanical difficulties in the heat exchangers which operate more readily at high pressure differences.

Therefore, in order to obtain the high liquid to gas ratio of expansion from a high pressure and yet minimize the temperature increase of the gas during expansion, applicant cools and expands in two stages along different constant pressure and constant enthalpy lines. As shown by the graph of FIG. 2, the total amount of temperature increase during the two stages of expansion along the solid line is much less than the amount of increase that would have occurred during a single expansion along the broken line from about 20 atm at about 4.6 degrees Kelvin to 1 atm of about 4.2 degrees Kelvin. Thus the cooling and expanding in two stages minimizes the temperature increase of the gas during expansion and yet provides a suitabley high pressure difference for the heat exchangers of the system.

Further, the farther to the left of the two-phase region in the graph of FIG. 2 to which the helium is expanded, the greater is the ratio of formed liquid to gas. As shown in FIG. 2, the solid line reaches the two-phase region to the left of the broken line, thus a greater ratio of liquid to gas is obtained by the two stage expansion than by a single expansion from 20 atm.

Further, the staged cooling and expanding provides a reasonable temperature pinch which is the temperature difference between the high (beginning) and the low (final) pressure gases in the expansion.

Typically, expansion to a lower pressure and thereby cooling was performed by decreasing the tubing in the flow path of the cryogen. In the present system, very small tubing is already used due to the small mass flow and small flow rate involved. Any decrease in such tubing is impossible, thus the staged cooling and isenthalpic expansion of the present invention is performed by two JT valves.

Staged compressors 19 and 23 are modular, independently operational rotary compressors. Compressor 19 provides the first stage of compression to the volume of working helium gas. The gas enters compressor 19 by line 19 at about 1 atm. Compressor 19 applies a compression of about 6 to 1, and the gas exits compressor 19 through line 21. The gas in line 21 is joined by incoming gas of line 15 at a pressure of about 6 atm from mechanical refrigerator 57. The joined gas flows to compressor 23 which is the second stage of the staged compression. The gas undergoes a compression of about 3 to 1 resulting in a pressure of about 20 atm. The high pressure gas exits compressor 23 and flow through lines 11 and 13. Line 13 leads to storage tank 69 and holds the pressure in line 11 constant by valve 67. That is, valve 67 opens and closes to allow that amount of compressed gas to flow to storage 69 such that the rest of the gas flows through line 11 at a constant pressure of about 20 atm. Similarly valve 71 opens and closes under the control of a regulator to allow that amount of gas to flow from storage 69 to line 91 such that the gas flowing in line 91 is at about 1 atm and ambient temperature. Likewise valve 73 holds the pressure in line 15 constant at about 6 atm.

In the preferred embodiment, staged compressors 19 and 23 are CTI E8096024 modules. The interconnect plumbing, pressure control regulators and storage tanks 69 of staged compressors 19 and 23 are housed in a base plate. A separate module houses the electronics involved and an adsorber. The separate module and the compressor modules share the base plate which ties the modules together.

The compressed gas is supplied to cooling means 25 by line 11 and is controlled by regulator valve 75. Regulator valve 75 controls the flow of gas to heat exchanger line 31a and thereby controls the pressure of that gas. It is preferred that the gas enters heat exchanger 31 at a pressure of about 20 atm due to the cooling and expansion scheme of FIG. 2. However, operating the system at another set of cooling and expansion pressures and temperature is possible. Valve 75 allows for the control of refrigeration capacity of the system. The downside pressure determines the temperature of the system. If capacity is decreased by valve 74 reducing the flow, a constant lower pressure gas will flow throughout the system. Due to JT valves 58 and 41 providing constant pressure drop regardless of flow rate, the return gas will subsequently be at a reduced pressure to which valve 71 will respond by bleeding high pressure gas from storage 69 to maintain the pressure and thus temperature of the gas returning in line 91.

Typically, adjustable JT valves are used to control capacity of prior art systems. Such valves are not conducive to the small working areas involved in the present invention. As a result, applicant controls system capacity by warm end valve 75 with the aid of bypass valve 71 to maintain the downside pressure and temperature. Further, valve 75 dampens pulses caused by the periodic flow of refrigerator 57 by inducing a controlled pressure drop in the flow.

Once the gas enters cooling means 25, it is cooled by heat exchanger 31 which is a counter flow exchanger as are heat exchangers 33, 35 and 37. Heat from the high pressure gas flowing through lines 31a, 33a, 35a and 37a is absorbed by lower pressure and cooler gas flowing out through line 31b, 33b, 35b and 37b respectively. This cools the entering working gas to above about 77 degrees Kelvin at heat exchanger 31, to about 15 degrees Kelvin at heat exchanger 33, to about 8 to 10 degrees Kelvin at heat exchanger 35 and to about 5 degrees Kelvin after heat exchanger 37.

Refrigerator 57 is positioned between heat exchanger 31 and 33 and is of the regenerator-displacer type. In the preferred embodiment a Gifford-McMahon cycle is used. Such a cycle cools by expanding compressed gas taken from line 11 through valve 70. The gas is first cooled in regenerative heat exchangers within a displacer in the cold finger housing 14. The regenerative matrix absorbs heat from the gas flowing in one direction. The gas is then expanded as valve 65 is opened and thus further cooled. The heat stored in the regenerator is then transferred back to the expanded gas as it is displaced through the regenerator. The first stage of the mechanical refrigerator 57 cools the working gas in the JT flow path in heat exchanger 47 to about 77 to 80 degrees Kelvin. Heat exchanger 33 further cools the working gas of the JT flow path between the first and second stage of refrigerator 57. The second stage cools the working gas to about 10 to 20 degrees Kelvin in heat exchanger 49.

Figure 4:
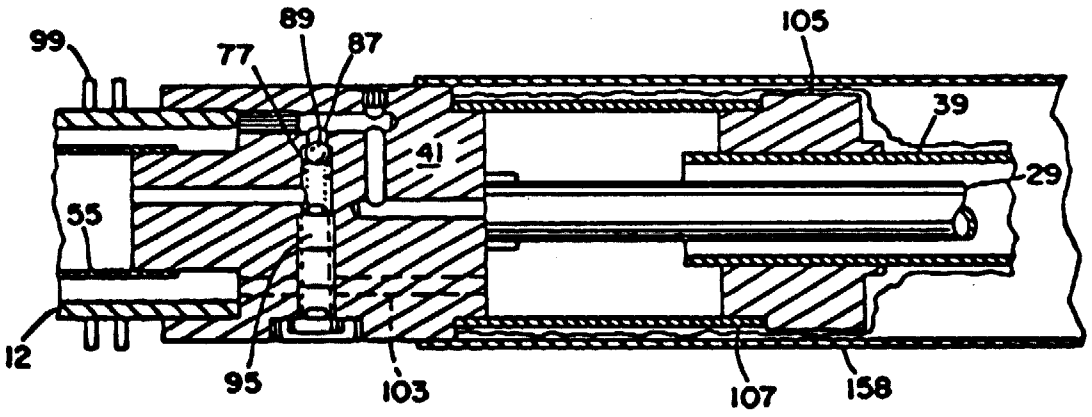
FIG. 4 is a longitudinal section through line A—A of the JT valve of FIG. 3.

Carbon adsorbers 43 and 53 purify the working gas before cooling by refrigerator 57. This prevents the clogging of the JT valves by contaminants and debris carried in the working gas. The flow areas to the JT valves 58 and 41 are set at very small dimensions due to the low mass flow, the high pressure and the low temperature of the working gas. Hence any debris in the working gas poses a potential clogging problem. In the preferred embodiment, the JT valves 58 and 41 are of the self-relieving type as disclosed in the Technical Support Package on Spring-Loaded Joule-Thomson Valve for May/June. 1986 NASA TECH Brief, vol. 10, no. 3, Item #8 from the JPL Invention Report NPO-16546/6048 and incorporated herein. In these spring-loaded Joule Thomson valves the pressure drop is regulated by a spring 77 pushing a stainless steel ball 89 against a seat 87, as shown in FIG. 4. Steel ball 89 is raised off seat 87 whenever the force of the upstream pressure exceeds the spring 77 force. Screw 95 adjusts the spring tension. The pressure drop remains nearly constant, regardless of the helium flow rate and of any contaminants carried into the valve by the gas. An increase flow rate merely lifts the ball 89 further and does not affect the pressure drop. Contaminants that freeze on the ball 89 or seat 87 cause ball 89 to lift slightly further and do not cause the valve to be permanently clogged as in a fixed orifice JT valve.

The working gas is further cooled by heat exchanger 35 through line 35a to about 10 degrees Kelvin before being expanded through JT valve 58. Expansion through JT valve 58 produces a working gas at a pressure of about 6 atm at about 8.5 degrees Kelvin. The cooled medium pressure working as is then further cooled in heat exchanger 37. The working gas is purified once again before flowing out of the cooling means 25. Carbon adsorber 63 is similar to adsorbers 43 and 53. At this point the working volume of gas is about 5 degrees Kelvin at 6 atm.

Cooling means 25 is housed in a vacuum inside a low conductive stainless steel cylinder 16 which forms the vacuum chamber. The cylinder 16 provides for thermal insulation from the outer surroundings of the cylinder at a temperature of about 300 degrees Kelvin. Cooling means 25 is rough pumped down to about $10^{-1}$ to $10^{-2}$ Torr and cryopumped to about $10^{-6}$ Torr to [from] *form* the vacuum. Charcoal adsorbent 17 is provided on the heat exchanger coils 47 and 49 to create a cryopumping surface which enables a high insulating vacuum. The mechanical refrigerator thus serves the added function of creating and maintaining an insulating vacuum.

Figure 3:
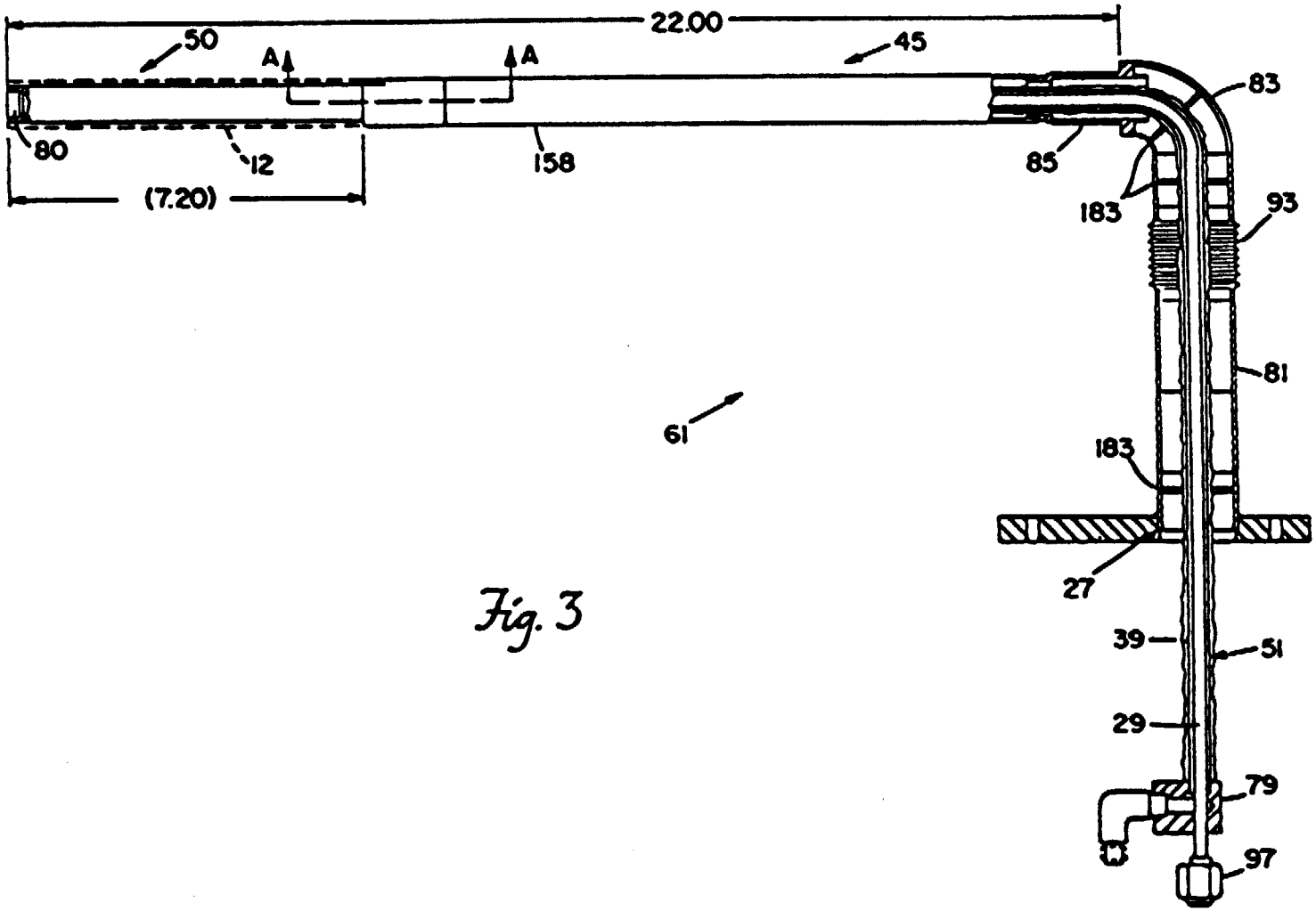
FIG. 3 is a side view, partially broken away, of a transfer line, JT valve and recondensing heat exchanger embodying the present invention.

As shown in FIG. 3, heat exchanger transfer line 61 is attached to cooling means 25 by connector piece 27. The outside surface of the connector piece 27 of transfer line 61 is about 300 degrees Kelvin. Tubing 81 extending from the piece 27 houses inner transfer tube 29 coaxially positioned in outer transfer tube 39. Inner transfer tube 29 serves as an extension of the line leading from adsorber 63 and is locked to the line by nut 97. Outer transfer tube 39 is the return line and is connected at a manifold 79 to line 37b. The coaxial transfer tubes provide for final counter flow heat exchange prior to expansion in the second JT valve 41. Inner transfer tube 29 has an outer diameter of about 3/16 inch and outer transfer tube 39 has an outer diameter of about ⅛ inch. Both tubes comprise stainless steel. A multilayer radiation shield 51 comprising aluminized mylar is packed around the outer transfer tube 39 to prevent heat leak from ambient.

Tubing 81 has an outer diameter of about 1.5 inches and houses inner and outer tube 29 and 39, respectively, in a vacuum. Nylon spacers 183 are positioned throughout tube 81 to support the transfer tubes. Bellows 93 allow for mechanical alignment when placing cold end 45 of the transfer line 61 into the subject cryostat 59. Elbow 83 provides about a 90 degree curve connecting housing tube 81 to tubing transition 85. Outer and inner tubes 39 and 29 have corresponding elbows within elbow 83. Transfer line 61 may be of other shapes for other cryostats in which case elbows of other degrees and bellows and the like are used to aid in mechanical alignment.

Around the bend of the "J" shape, tubing transition 85 extends into a thin poorly conducting stainless steel outer tubing 158 of about 15 inches in length. This enables the transition in outer surface temperature from 300 degrees Kelvin at the connector end to about 4.2 degrees Kelvin at the cold cryostat end 45. Tubing 158 provides a continuation of the vacuum housing for coaxial transfer tubes 29 and 39.

As shown in FIG. 4, the end of outer transfer tube 39 leading to JT valve 41 is adapted by tubing reducer 105 which is fitted into connecting tube 107. Within connecting tube 107 the end of inner transfer tube 29 is connected to JT valve 41.

JT valve 41 is positioned in the cryostat 59 at the cold end of tubing 158. This position minimizes the problems associated with transferring the liquid-gas mixture formed upon expansion through the JT valve at low pressure as in prior art systems. Further the thermodynamic efficiency of the system is enhanced by JT valve 41 expanding the cold working gas closer to the recondensing heat exchanger 50 such that the expanded gas is not effected by the returning gas of a warmer temperature or the pressure drop associated with flowing to the cold end 45.

Transfer line 61 itself serves as a coaxial heat exchanger. It provides the final precooling prior to the second JT valve 41 in cryostat 59 where final expansion of the working gas 41 results in a cold liquid-gas mixture in inner tube 55.

Figure 5:
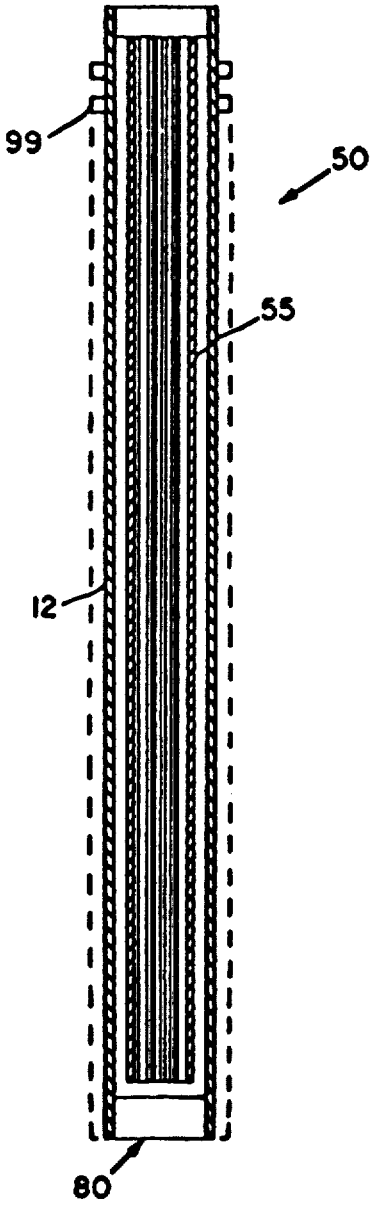
FIG. 5 is a longitudinal section of the heat exchanger of FIG. 3.
Figure 6:
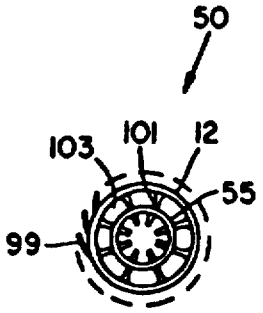
FIG. 6 is a cross sectional view of the heat exchanger of FIG. 3.

As shown in FIGS. 5 and 6, cold end 45 of the transfer line 61 comprises a recondensing heat exchanger structure 50 formed of inner tube 55 positioned coaxially within an outer tube 12. The inner walls of both tubes 55 and 12 comprise fins which protrude radially inward. The fins define flow channels and aid in heat transfer to the cryogen flowing through the tubes. In the preferred embodiment, outer tube 12 has about 14 fins 101 and tube 12 is pressed around inner tube 55 such that fins 101 are in mechanical contact with inner tube 55. This enhances the transfer of heat from outer tube 12 to inner tube 55 and helium flowing in channels 103.

End cap 80 plugs outer tube 12 at the cold end of tube 12. Hence, the working gas and liquid mixture is prevented from communicating with the cryostat cryogen and is transferred from inner tube 55 to channels 103 in outer tube 12. The working gas and liquid mixture in the coaxial tubes 55 and 12 absorbs heat from the cryogen boil-off in the cryostat through outer tube 12, fins 101 and end cap 80.

Between JT valve 41 and end cap 80, outer tube 12 comprises burrs 99 which are formed from the outer surface of outer tube 12. The outer surface of outer tube 12 is radially shaved to lift edges of material away from the surface of the tube. These shaved edges are then cut circumferentially into several burrs called spines. One type of such spining is performed by Heatron Inc. of York, Pa. In the preferred embodiment, outer tube 12 at cap end 80 has about 26 spines per turn with about 0.125 inch spacing between turns. The outer diameter of outer tube 12 around burrs 99 is less than about 0.9 inch which enables access in narrow ports of a cryostat.

The amount of heat absorbed from the cryogen boil-off is a function of the heat transfer coefficient of the working gas (i.e., helium) and the projected surface area of recondensing heat exchanger 50. Helium has a low heat transfer coefficient which necessitates large surface area in order to appreciably recondense the boil-off. The spined surface of outer tube 12 provides such an increase in surface area over other tubing used in prior art devices. The spined tubing provides a surface area per unit of projected area of about 5. The burrs 99 further provide many sites for condensate droplets to form and drip off the surface.

In the preferred embodiment, the working gas is transferred to end cap 80 through inner tube 55 [qwhich] *which* has an outer diameter of about 0.5 inch. Outer channels 103 formed between inner tube 55 and outer tube 12 carry the working gas in reverse direction back to line 91 through side "b" of heat exchangers 37, 35, 33 and 31. On the return, the working gas absorbs heat at each heat exchanger and exits through line 91 to form a closed loop system.

While the invention has been particularly shown and described with reference to a preferred embodiment thereof, it will be understood by those skilled in the art that various changes in form and detail may be made therein without departing from the spirit and scope of the invention as defined by the appended claims.

We claim:

1. A cryogenic recondenser for recondensing cryogen retained in a storage vessel, the recondenser comprising:

cooling means comprising a mechanical refrigerator positioned outside of the storage vessel, said means precooling a volume of gaseous refrigerant;

a transfer line leading from the cooling means and removeably inserted into the storage vessel; and a JT valve at an end of the transfer line in the storage vessel, the precooled refrigerant being transferred in the transfer line from the cooling means to the JT valve in heat exchange relation with returning refrigerant and being expanded through the JT valve to form a liquid-gas cryogen mixture within the end of the transfer line which is in heat exchange relation with boil-off from the cryogen retained in the storage vessel such that the boil-off is cooled and recondensed;

refrigerant being returned to the cooling means through the transfer line in a manner in which the returning refrigerant is in heat exchange relation with the refrigerant being transferred to the JT valve.

2. A cryogenic recondenser as claimed in claim 1 wherein said mechanical refrigerator is of the Gifford-McMahon regenerator displacer type system.

3. A cryogenic recondenser as claimed in claim 2 wherein said cooling means further include another JT valve for receiving the refrigerant precooled by the mechanical refrigerator and expanding the precooled refrigerant.

4. A cryogenic recondensor as claimed in claim 1 further comprising a recondensing heat exchanger connected to the JT valve for receiving the formed liquid-gas cryogen mixture and passing the mixture in heat exchange relation with the boil-off such that the boil-off is cooled and recondensed.

5. A cryogenic recondensor as claimed in claim 4 wherein the recondensing heat exchanger connected to the JT valve comprises an inner tube coaxially positioned within an outer tube, the formed liquid-gas cryogen mixture being transferred from the JT valve in one tube and passed to the other tube in heat exchange relation with the boil-off.

6. A cryogenic recondensor as claimed in claim 5 wherein the transfer line comprises an inner tube coaxially positioned within an outer tube, the precooled refrigerant to be expanded by the JT valve being transferred to the end of the transfer line in one tube and the precooled refrigerant expanded through the JT valve being transferred back to said cooling means through the other tube.

7. A cryogenic recondenser as claimed in claim 5 wherein the outer tube comprises an outer surface having a plurality of burrs on which cryogen condensate forms, and the outer tube has an outer diameter of less than about 1 inch.

8. A cryogenic recondenser as claimed in claim 4 wherein the recondensing heat exchanger has an outer diameter of less than about one inch.

9. A cryogenic recondensor as claimed in claim 1 wherein the transfer line comprises an inner tube coaxially positioned within an outer tube, the precooled refrigerant to be expanded by the JT valve being transferred to the end of the transfer line in one tube and the precooled refrigerant expanded through the JT valve being transferred back to said cooling means through the other tube in heat exchange relation with the precooled refrigerant in the one tube.

10. A cryogenic recondensor as claimed in claim 9 further comprising a coaxial recondensing heat exchanger connected to the JT valve for receiving the formed liquid-gas cryogen mixture and passing the mixture in heat exchange relation with the boil-off such that the boil-off is cooled and recondensed.

11. A cryogenic recondensor as claimed in claim 1 wherein the volume of gaseous refrigerant is helium.

12. A cryogenic recondensor as claimed in claim 1 wherein said cooling means further comprises a charcoal adsorbent for creating a vacuum about said mechanical refigerator.

13. Apparatus for cooling a bath of cryogen in a cryostat in which a magnetic coil of a magnetic resonance imaging system is cooled, the apparatus comprising:

a mechanical refrigerator positioned outside of the bath, said refrigerator precooling a volume of gaseous refrigerant;

a transfer line leading into the cryostat; and a JT valve at an end of the transfer line in the cryostat, the transfer line transferring the precooled refrigerant from the mechanical refrigerator to the JT valve in heat exchange relation with returning refrigerant, the precooled refrigerant being expanded through the JT valve to form a liquid and gas cryogen mixture at the end of the transfer line in the cryostat, the formed liquid and gas mixture being in heat exchange relation with boil-off from the bath and thereby recondensing said boil-off;

the refrigerant being returned to the mechanical refrigerator through the transfer line in heat exchange relation with the precooled and expanded refrigerant being transferred to the JT valve.

14. Apparatus as claimed in claim 13 wherein the mechanical refrigerator is in conjunction with an external JT valve positioned outside of the bath, the external JT valve expanding the precooled refrigerant for a first time such that the transfer line transfers precooled and expanded refrigerant to the JT valve at the end of the transfer line in the bath, and the JT valve at the end of the transfer line further expanding the precooled and expanded refrigerant to form the liquid and gas cryogen mixture within the end of the transfer line leading into the bath.

15. Apparatus as claimed in claim 13 wherein the refrigerator is of the Gifford-McMahon regenerator-displacer type.

16. Apparatus as claimed in claim 13 wherein the transfer line comprises an inner tube coaxially positioned within an outer tube, the precooled and expanded refrigerant being transferred to the JT valve at the bath end of the transfer line in the inner tube and being transferred back to said mechanical refrigerant through the outer tube.

17. Apparatus as claimed in claim 16 further comprising a coaxial recondensing heat exchanger having an inner tube coaxially positioned within an outer tube, said coaxial recondensing heat exchanger positioned at the end of the JT valve for receiving the formed liquid and gas cryogen mixture, the cryogen mixture from the JT valve being received by the inner tube and passed to the outer tube in heat exchange relation with the boil-off.

18. Apparatus as claimed in claim 17 wherein the outer tube of the coaxial recondensing heat exchanger has an outer diameter of less than about 1 inch.

19. Apparatus as claimed in claim 13 wherein the volume of gaseous refrigerant is helium.

20. Apparatus as claimed in claim 13 wherein said mechanical refrigerator further comprises a charcoal adsorbent for creating and maintaining a vacuum about said mechanical refrigerator.

21. Apparatus for recondensing boil-off from a bath of cryogen retained in a cryostat comprising:

cooling and expansion means comprising a mechanical refrigerator positioned outside of the cryostat, said means precooling and expanding a volume of working gas;

a coaxial transfer line having an inner tube coaxially positioned within an outer tube leading into the cryostat;

a JT valve at an end of the coaxial transfer line in the cryostat, said precooled and expanded working gas being transferred through the inner tube of the coaxial transfer line to the JT valve in heat exchange relation with the working gas flowing in the outer tube of the coaxial transfer line and being expanded through the JT valve to form a liquid and gas cryogen mixture; and a coaxial recondensing heat exchanger having an inner tubing coaxially positioned within an outer tubing and positioned at an end of the JT valve for receiving the formed liquid and gas cryogen mixture, the formed cryogen mixture being passed through the inner tubing and the outer tubing in heat exchange relation with the boil-off such that said boil-off is recondensed and said cryogen being returned to the cooling and expansion means through the outer tube of the coaxial transfer line.

22. Apparatus as claimed in claim 21 wherein the outer tubing of the coaxial recondensing heat exchanger has an outer diameter of less than about one inch and comprises an outer surface having a plurality of burrs on which the boil-off recondenses.

23. Apparatus as claimed in claim 21 wherein the outer tube of the coaxial transfer line and the outer tubing of the coaxial recondensing heat exchanger are less than about one inch in outer diameter.

24. A method of condensing cryogen gas comprising the steps of:

precooling a stream of compressed gas;

expanding the precooled gas through a first JT valve to form a stream of medium pressure gas;

cooling the stream of medium pressure gas; and expanding the cooled stream of medium pressure gas through a second JT valve in a cryostat which is remote from said first JT valve, expansion through the second JT valve forming a cold mixture of liquid and low pressure gas which is in heat exchange relation with cryogen boil-off from a volume of liquid cryogen contained in the cryostat and thereby recondenses the boil-off.

25. A method of condensing cryogen gas as claimed in claim 24 wherein the step of precooling is by means of a mechanical refrigerator of the regenerator-displacer type system.

26. A method of condensing cryogen as claimed in claim 24 wherein the stream of gas is helium.

27. A condenser comprising:

a mechanical refrigerator for precooling a stream of compressed gas;

a first JT valve for expanding the precooled stream of compressed gas to a medium pressure stream of precooled gas; and a heat exchanging and transfer means for further cooling and transferring the medium pressure precooled gas between the first JT valve and a second JT valve, the second JT valve expanding the medium pressure stream of further cooled gas, said expansion by the second JT valve forming a cold mixture of liquid and gas at a pressure below the medium pressure, the first and second JT valves being remotely positioned from each other, the second being in a storage vessel and the first being outside of the storage vessel.

28. A heat exchange surface for condensing cryogen comprising a coaxial heat exchanger having an inner tube coaxially positioned within an outer tube, the outer tube having an end with a plurality of extensions from an outer surface of the end, condensate forming on said extensions, the extensions forming an outer diameter of the outer tube of less than about one inch; and the outer tube having a plurality of radially inward protrusions along its inner walls, the protrusions bridging between the inner and outer tubes.

29. A heat exchange surface positioned at an end of a transfer line leading into a dewar of condensing cryogen in the dewar comprising a coaxial heat exchanger having an inner tube positioned within an outer tube, said outer tube having a plurality of extensions from an outer surface and an outer diameter of less than about one inch.

30. A heat exchange surface for condensing cryogen comprising:

an outer tube having a closed end and burrs on an outer surface; and an inner tube coaxially positioned with the outer tube forming a central and intermediate channels, at least one channel for passing helium gas in one direction through one tube and the other channels for passing helium gas in an opposite direction through the other tube, the helium gas being transferred from one tube to the other in heat exchange relation with the cryogen to be condensed, the burrs being unitary with the outer tube and formed by a series of circumferential and radial cuts into the outer surface of the outer tube.

31. A heat exchange surface as claimed in claim 30 wherein said outer tube is less than about one inch in outer diameter.

*32. A cryogenic recondenser for recondensing cryogen retained in a cryostat, the recondenser comprising:*

*cooling means for precooling a volume of gaseous refrigerant, the cooling means comprising a mechanical refrigerator positioned outside of the cryostat and a first JT valve for receiving the refrigerant precooled by the mechanical refrigerator and expanding the precooled gas;* a transfer line leading from the cooling means and removably inserted into the cryostat; and a second JT valve coupled to the transfer line, the precooled and expanded refrigerant being transferred in the transfer line from the cooling means to the second JT valve in heat exchange relation with returning refrigerant and being expanded through the second JT valve to form a liquid-*gas cryogen mixture for the end of the transfer line in the cryostat which is in heat exchange relation with boil-off from the cryogen retained in the cryostat such that the boil-off is cooled and recondensed;*

*refrigerant being returned to the cooling means through the transfer line in a manner in which the returning refrigerant is in heat exchange relation with the refrigerant being transferred to the second JT valve.*

*33. A cryogenic recondenser as claimed in claim 32 wherein said mechanical refrigerator is of the Gifford-McMahon regenerator displacer type system.*

*34. A cryogenic recondenser as claimed in claim 32 further comprising a recondensing heat exchanger connected to the end of the transfer line in the cryostat for receiving the formed liquid-gas cryogen mixture and passing the mixture in heat exchange relation with the boil-off such that the boil-off is cooled and recondensed.*

*35. A cryogenic recondenser as claimed in claim 34 wherein the recondensing heat exchanger comprises an inner tube coaxially positioned within an outer tube, the formed liquid-gas cryogen mixture being transferred from the second JT valve in one tube and passed to the other tube in heat exchange relation with the boil-off.*

*36. A cryogenic recondenser as claimed in claim 35 wherein the transfer line comprises an inner tube coaxially positioned with in an outer tube, the precooled refrigerant expanded by the second JT valve being transferred to the end of the transfer line in one tube and the refrigerant being transferred back to said cooling means through the other tube.*

*37. A cryogenic recondenser as claimed in claim 35 wherein the outer tube comprises an outer surface having a plurality of burrs on which cryogen condensate forms, and the outer tube has an outer diameter of less than about 1 inch.*

*38. A cryogenic recondenser as claimed in claim 34 wherein the recondensing heat exchanger has an outer diameter of less than about one inch.*

*39. A cryogenic recondenser as claimed in claim 32 wherein the transfer line comprises an inner tube coaxially positioned within an outer tube, the precooled refrigerant expanded by the second JT valve being transferred to the end of the transfer line in one tube and the refrigerant in the end of the transfer line being transferred back to said cooling means through the other tube in heat exchange relation with the precooled refrigerant in the one tube.*

*40. A cryogenic recondenser as claimed in claim 39 further comprising a coaxial recondensing heat exchanger connected to the end of the transfer line in the cryostat for receiving the formed liquid-gas cryogen mixture and passing the mixture in heat exchange relation with the boil-off such that the boil-off is cooled and recondensed.*

*41. A cryogenic recondenser as claimed in claim 32 wherein the volume of gaseous refrigerant is helium.*

*42. A cryogenic recondenser as claimed in claim 32 wherein said cooling means further comprises a charcoal adsorbent for creating a vacuum about said mechanical refrigerator.*

*43. Apparatus for cooling a bath of cryogen retained in a cryostat, the apparatus of the type comprising cooling means with a mechanical refrigerator positioned outside of the cryostat, a transfer line leading from the cooling means and removeably inserted into the cryostat, a first JT valve coupled to the transfer line for expanding precooled refrigerant transferred from the cooling means by the transfer line to form a liquid-gas cryogen mixture for the end of the transfer line in the cryostat which is in heat exchange relation with boil-off from the cryogen retained in the cryostat, the apparatus further characterized by:* a second JT valve for receiving the refrigerant precooled by the mechanical refrigerator and expanding for the first time the precooled refrigerant before the refrigerant is transferred through the transfer line to the first JT valve coupled thereto for additional expansion therethrough.

*44. Apparatus as claimed in claim 43 wherein the refrigerator is of the Gifford-McMahon regenerator-displacer type.*

*45. Apparatus as claimed in claim 43 wherein the transfer line comprises an inner tube coaxially positioned within an outer tube, the precooled and first time expanded refrigerant being transferred to the first JT valve coupled to the transfer line in the inner tube and being transferred back to said mechanical refrigerator through the outer tube.*

*46. Apparatus as claimed in claim 45 further comprising a coaxial recondensing heat exchanger having an inner tube coaxially positioned with an outer tube, said coaxial recondensing heat exchanger positioned at the end of the transfer line for receiving the formed liquid and gas cryogen mixture, the cryogen mixture from the first JT valve coupled to the transfer line being received by the inner tube and passed to the outer tube in heat exchange relation with the boil-off.*

*47. Apparatus as claimed in claim 46 wherein the outer tube of the coaxial recondensing heat exchanger has an outer diameter of less than about* 1 inch.

*48. Apparatus as claimed in claim 43 wherein the volume of gaseous refrigerant is helium.*

*49. Apparatus as claimed in claim 43 wherein said mechanical refrigerator further comprises a charcoal adsorbent for creating and maintaining a vacuum about said mechanical refrigerator.*

*50. A cryogenic recondenser for recondensing cryogen retained in a cryostat, the recondenser of the type comprising cooling means with a mechanical refrigerator positioned outside of the cryostat, a transfer line leading from the cooling means and removeably inserted into the cryostat, a JT valve coupled to the transfer line for expanding precooled refrigerant transferred from the cooling means by the transfer line to form a liquid-gas cryogen mixture for the end of the transfer line in the cryostat which is in heat exchange relation with boil-off from the cryogen retained in the cryostat, the cryogenic recondenser further characterized by:* a coaxial recondensing heat exchanger comprising an inner tube coaxially positioned within an outer tube, the coaxial recondensing heat exchanger connected to the end of the transfer line for receiving the formed liquid gas cryogen mixture and passing the mixture in heat exchange relation with the boil-*off, such that the boil-off is cooled and recondensed.*

51. A cryogenic recondenser as claimed in claim 50, wherein the transfer line comprises an inner tube coaxially positioned within an outer tube, the precooled refrigerant, expanded by the JT valve, being transferred to the end of the transfer line in one tube and the precooled and expanded refrigerant at the end of the transfer line being transferred back to said cooling means through the other tube.

*52. A cryogenic recondenser as claimed in claim 50 wherein the outer-tube comprises an outer surface having a plurality of burrs on which cryogenic condensate forms and the outer-tube has an outer diameter of less than about 1 inch.*

* * * * *